Figure 1:

United States Patent [19]

Kuhn

[11] 4,097,558

[45] Jun. 27, 1978

[54] RESIN BLEND FOR MAKING PLASTISOLS AND ORGANOSOLS

[75] Inventor: Leroy B. Kuhn, Easton, Conn.

[73] Assignee: Stauffer Chemical Company, Westport, Conn.

[21] Appl. No.: 785,484

[22] Filed: Apr. 7, 1977

Related U.S. Application Data

[60] Continuation of Ser. No. 624,497, Oct. 21, 1975, abandoned, which is a division of Ser. No. 506,131, Sep. 18, 1974, Pat. No. 4,002,702, which is a continuation-in-part of Ser. No. 403,363, Oct. 4, 1973, abandoned, which is a continuation-in-part of Ser. No. 202,456, Nov. 26, 1971, abandoned.

[51] Int. Cl.$^2$ ............................................. C08L 27/06
[52] U.S. Cl. ................................ 260/899; 260/2.5 P; 260/23 XA; 260/28.5 D; 260/30.1 R; 260/30.8 R; 260/31.2 R; 260/31.4 R; 260/31.8 M; 260/33.2 R; 260/33.4 R; 260/897 C
[58] Field of Search ......................................... 260/899

[56] References Cited

U.S. PATENT DOCUMENTS

| 3,329,642 | 7/1967 | Lima et al. ........................... 260/31.4 |
| 3,555,122 | 1/1971 | Simons ................................. 260/899 |
| 3,682,857 | 8/1972 | Harris et al. ......................... 260/33.8 |

FOREIGN PATENT DOCUMENTS

| 855,758 | 11/1970 | Canada. |
| 1,087,390 | 10/1967 | United Kingdom. |
| 1,063,485 | 3/1967 | United Kingdom. |

*Primary Examiner*—Carman J. Seccuro
*Attorney, Agent, or Firm*—Richard P. Fennelly

[57] ABSTRACT

There are disclosed novel particulate forms of emulsion or dispersion resins for use in plastisols and organosols as well as an improved process for their preparation. This process comprises blending a dispersion resin latex with a nucleating resin which may be in the form of either a wet cake or a dry powder and then, preferably, spray drying the resulting blend. The novel blends of this invention are characterized by substantial improvements in many of their physical and rheological properties while the process used for their preparation has many advantages over the procedures presently utilized for preparing such mixtures including improved material handling, substantial savings in time and the achievement of more efficient drying. The resins of this invention lend themselves to bulk handling in most types of conventional bulk handling equipment.

26 Claims, 4 Drawing Figures

RESIN BLEND FOR MAKING PLASTISOLS AND ORGANOSOLS

RELATED APPLICATIONS

This application is a continuation application of U.S. Ser. No. 624,497, filed Oct. 21, 1975, now abandoned, which is a division of application Serial No. 506,131, now U.S. Patent 4,002,702, filed 9/18/74; which was a continuation-in-part application of U.S. Ser. No. 403,363, filed Oct. 4, 1973, now abandoned, which in turn was a continuation-in-part application of U.S. Ser. No. 202,456, filed Nov. 26, 1971, now abandoned.

BACKGROUND OF THE INVENTION

Plastisols and organosols are well known to those skilled in the art. Thus, a plastisol is a suspension of a finely divided homopolymer or copolymer of vinyl chloride in one or more liquid plasticizers which have little or no tendency to dissolve the resin at ambient temperatures but which becomes a solvent for the resin upon being heated. Organosols are similar to plastisols with the exception that they also contain about 5% or more of one or more volatile diluents and dispersants. At elevated temperatures the vinyl chloride resin is completely dissolved in the plasticizers, forming an essentially homogeneous plastic mass which upon cooling is in the form of a substantially flexible solid. Additives such as fillers, antioxidants, stabilizers and colorants are also usually present in these formulations. Plastisols are conveniently utilized in a wide variety of processes in the plastics industry including rotational molding, slush molding, dipping, spraying, film casting and coating while organosols are used primarily in spread coating applications as well as in some spray and dip coating applications.

A procedure which is often employed in the compounding of plastisols and organosols involves the admixture of a dispersion resin with an extender or blending resin. Dispersion resins are vinyl chloride homopolymers or copolymers which can have a very small particle size in the range of about 0.1 to 3.0 microns which permits them, after suitable processing such, for example, as by grinding to be mixed with plasticizers by simple stirring techniques. Such dispersions are often diluted with extender resins which are usually prepared by suspension polymerization processes and which have substantially larger particle sizes in the range of from about 5 to 60 microns. In addition to reducing costs, the partial replacement of dispersion resins with extender or "suspension" resins also serves to alter certain properties of the resulting plastisol of organosol resin blend.

The preparation of plastisols or organosols containing these blends of dispersion and extender resins often presents many processing problems to the practitioner because of the mechanical difficulties and material handling operations involved in preparing a homogeneous blend of two dry particulate materials whose respective particle sizes differ substantially from one another. In addition, the extender and dispersion resins must each be subjected to separate drying operations prior to being blended. And, in the case of the dispersion resin particles, upon being spray dried prior to being dispersed in a plasticizer, they will ordinarily agglomerate into clumps having a diameter of up to about 100 microns which necessitates, as noted above, the grinding of the resulting agglomerated resin so as to reduce these agglomerates to a more suitable particle size. This is necessary as the agglomerate will not otherwise disperse. Moreover, since the final blending operation of the dispersion and extender resins within a plasticizer is ordinarily carried out by the customer or ultimate user of the resins rather than by their manufacturer, the user is required to maintain an inventory of both the extender and dispersion resins.

Thus, it is the prime object of this invention to utilize an improved procedure to prepare blends of dispersion and extender resins displaying unique physical and rheological properties. It is a further object of this invention to prepare these unique blends by means of a novel process which substantially eliminates the various mechanical difficulties and handling operations which are presently involved in their preparation. Various other objectives and advantages of this invention will be apparent from the disclosure which follows hereinafter.

TECHNICAL DISCLOSURE OF THE INVENTION

It has now been found that blends of dispersion and nucleating resins characterized by unusual physical and rheological properties may be simply and conveniently prepared by means of a procedure whereby an aqueous latex of a dispersion resin is blended with a nucleating resin which may be in the form of either a dry powder, a moist mass, or a wet cake, whereupon the resulting mixture is then spray dried under non-coagulating conditions, i.e. avoidance of excessive shear.

In addition to resulting in the preparation of blends which display unique physical and rheological properties this novel procedure has many advantages over the above described prior art blending techniques including its far greater speed, more efficient spray drying because of the higher resin solids content of the blends and, in certain instances, the elimination of the need for the ultimate user to maintain inventories of both the extender and dispersion resins and to thereafter carry out the blending step. Moreover, in most cases, the need for grinding the resulting blend is eliminated or minimized since the agglomerates of resin particles which are formed in this process do not hold together as tenaciously as is the case when dispersion resin latices are spray dried by conventional techniques. As noted above, the ability of the subject resins to be bulk handled is a substantial advantage to both the manufacturers and the end user.

Thus, with respect to the novel blends of this invention, it is to be noted that they are characterized by a higher degree of homogeneity and consistency than is found in the blends resulting from the prior art process. The dry plastisol resins of this invention have been found to display the ability to be bulk handled. Moreover, after being compounded with a plasticizer, the resulting plastisols and organosols based upon these blends are found to display totally unexpected rheological, dispersion and mixing characteristics as well as enhanced resistance to the settling out of large resin particles.

The term "nucleating resins" as employed herein is defined as a vinyl chloride resin containing at least 50% vinyl chloride polymerized therein, the particles of which are in the range of from about 5 to about 60 microns in size. The nucleating resins can be solid resin particles such as the extender or suspension resins, in which case the resin particles should not exceed the upper particle size limitations of 60 microns, or the nucleating resins can be made up of dispersion or emulsion resin particles agglomerated together to provide a total agglomerated particle size, preferably in the range of 5 to 60 microns although in this instance there is no upper limit, provided these particle agglomerates readily fragment in a plasticizer.

When the nucleating resin employed is a suspension resin the product blend resin has both the physical and rheological advantages set forth above but also the advantage to the end user that extender or suspension resin need not be inventoried.

In the case of a latex agglomerate employed as a nucleating resin the physical and rheological advantages are realized as well as certain process advantages.

In the case of either type of nucleating resin the resin products provide the outstanding advantage of being bulk handleable without the need for subsequent grinding or milling.

In greater detail, now, the emulsion and nucleating resins utilized in the process will both, preferably, be polyvinyl chloride. However, if desired copolymers of vinyl chloride with a minor proportion of one or more comonomers may also be utilized as either the emulsion or nucleating resin or both. These optional comonomers include alph-olefins such as ethylene, propylene and butylene; vinyl esters of carboxylic acids such as vinyl acetate, vinyl benzoate and vinyl stearate; vinylidene halides such as vinylidene chloride; the $C_1$-$C_{20}$ esters of acrylic and methacrylic acid such as methyl methacrylate, methyl acrylate, ethyl acrylate, butyl acrylate, 2-ethylhexyl acrylate and lauryl acrylate; aryl, halo- and nitro- substituted benzyl esters of acrylic and methyacrylic acid such as benzyl acrylate and 2-chlorobenzyl acrylate, ethylenically unsaturated monocarboxylic-acids such as acrylic and methacrylic acids; ethylenically unsaturated dicarboxylic acids, their anhydrides and their $C_1$-$C_{20}$ mono- and dialkyl esters such as aconitic acid, fumaric acid, maleic acid, itaconic acid, citraconic acid, maleic anhydride, dibutyl fumarate and mono- ethyl maleate; amides of ethylencially unsaturated carboxylic acids such as acrylamide and methacrylamide; nitriles of ethylenically unsaturated carboxylic acids such as acrylonitrile and methacrylonitrile; vinyl pyrrolidones such as N-vinyl-2-pyrrolidone; $C_1$-$C_{20}$ alkyl vinyl esters such as methyl vinyl ether, ethyl vinyl ether and stearyl vinyl ether; dienes such as isoprene and butadiene; vinyl phosphonates such as bis(2-chloroethyl)vinyl phosphonate; and, any other vinyl monomers copolymerizable with vinyl chloride. From the above group, it is to be noted that vinyl acetate is the preferred optional comonomer for use in preparing vinyl chloride emulsion or nucleating resins which may be employed in the blending process of this invention.

The actual preparation of the emulsion or dispersion resins may be accomplished by means of emulsion polymerization procedures well known to those skilled in the art. These procedures usually involve dispersing the vinyl chloride, along with any optional comonomers, in a aqueous medium containing from about 0.1 to 2.5% by weight of the monomers, of one or more anionic, nonionic or cationic emulsifiers such, for example, as the alkyl carboxylic acid salts, the alkyl sulfate salts, the alkyl sulfonate salts, the alkyl phosphate salts, the alkyl sulfosuccinate salts, the alky aryl ether alcohols and the alkyl aryl polyether sulfate salts. The resulting aqueous monomer emulsion is then heated for about 4 to 24 hours at a temperature of from about 25° to 100° C. in the presence of from about 0.01 to 5%, by weight of the monomer mixture, of a water soluble, free radical initiating catalyst such as, for example, ammonium, sodium or potassium persulfate, hydrogen peroxide or a redox system comprising a mixture of a persulfate with an alkali metal bisulfite, thiosulfate or hydrosulfite.

For use in the blending process of this invention, the resulting aqueous latices should contain from about 20 to 65%, by weight, of resin solids in the form of particles dispersed within a continuous aqueous phase. The polymer particles should have an average particle size in the range of from about 0.1 to 3.0 and, preferably, about 1.0 microns. The molecular weight of these emulsion resins is most conveniently expressed in terms of their relative viscosity, i.e. the ratio of the kinematic viscosity of a specified solution of the polymer to the kinematic viscosity of the pure solvent. Thus, these dispersion resins should have a relative viscosity of from about 1.5 to 3.5, preferably about 2.75, as determined, at 25° C., with a 1.0% by weight, solution of the polymer in cyclohexanone.

The nucleating resin is prepared in a manner dependent upon the type of final product desired. For example, if the final product desired is an extended resin, i.e., a mixture of both emulsion resin and suspension or extender resin then the nucleating resin employed is a suspension resin. In this instance, the suspension resin is prepared by means of suspension polymerization procedures well known to those skilled in the art. In these procedures, the vinyl chloride monomer, or mixture of vinyl chloride monomer with one or more optional comonomers, is dispersed in an aqueous medium containing from about 0.01 to 10%, as based on the total weight of the monomer mixture, of a suspending agent such, for example as gelatin, starch, hydroxymethyl cellulose, hydroxyethyl cellulose, hydroxypropyl cellulose, carboxymethyl cellulose, talc, clay, polyvinyl alcohol and the like. As a catalyst for the polymerization, one may use from about 0.005 to 5%, as based on the total weight of the monomer mixture, of a monomer soluble azo or peroxide catalyst such, for example, as azobisisobutyronitrile, lauroyl peroxide, benzoyl peroxide, isopropyl peroxydicarbonate, t-butyl peroxypivalate and the like.

Polymerization may ordinarily be initiated by heating the system to a temperature in the range of from about 40 to 100° C. for a period of from about 2 to 24 hours with agitation being applied throughout the course of the reaction. The resulting product will comprise an aqueous suspension of the vinyl chloride polymer which will be in the form of particulate solids, and which should have a resin solids content in the range of from about 25 to 50%, by weight; these particles are dispersed within the continuous aqueous phase. For use in the process of the invention, these polymer particles should have an average particle size in the range from about 15 to 60, and preferably about 20 microns. These extender resins should have a relative viscosity of from about 1.5 to 3.5, preferably about 2.0-2.75, as determined, at 25° C. with a 1% solution of the polymer in cyclohexanone.

When the final product desired is a non-extended, i.e., totally emulsion resin, the nucleating resin employed is an emulsion resin agglomerate.

These emulsion resin agglomerates can be prepared by several methods and any of such methods can be employed to prepare the nucleating resins employed herein, provided that the method used produces agglomerates which readily disperse in plasticizer without grinding or milling.

One method which can be effectively employed is to heat the latex resin in the presence of a small amount of a solvent mixture of a ketone and an alkanol. Acetone or cyclohexanone and methanol have been found to be effective solvents. The solvents are used in amounts which provide resins which will easily fragment. The latex and solvent are generally heated to a temperature of from about 50° C. to about reflux and are maintained at such temperatures until the latex coagulates.

A complete description for the preparation of such agglomerates can be found in Canadian Pat. No. 851,787 entitled "Macroreticular Resins Prepared from Vinyl Polymer Latices" assigned to Stauffer Chemical Company.

Another method, and one which is preferred in the conduct of the present invention is both simple and novel. This method simply requires that an emulsion resin latex be spray dried at a temperature below that at which the particle surfaces become permanently bound. While the exact conditions vary somewhat depending on the spray drying equipment, resins and rates employed, these temperatures are usually such that the air outlet temperature is in the range of from about 90° F. to 130° F. and preferably in the range of from about 105° to 125° F. The latex spray dried at these temperatures form agglomerates which readily disperse in plasticizer. These nucleating resins can be bulk handled as such but this characteristic is enhanced by further treatment in accordance with this invention. These agglomerates generally have particle sizes from unit particles (generally less than 1%) to 100 microns and average from about 5 to about 20 microns. While these resins can be bulk handled without further treatment they can be employed as nucleating resins in the process of this invention to provide an improved product with enhanced bulk handling characteristics.

In conducting the blending process of this invention employing a suspension resin as a nucleating resin, it is necessary to convert the suspension resin into the form of either a wet cake or a dry powder. Thus, in converting it into a wet cake, the water content of the aqueous suspension of the resin is first reduced to within the range of from about 5 to 50, and preferably about 5–25%, by weight. Conversely, this reduction in its water content effects an increase in the resin solids content of the suspension to within the range of from about 50 to 95 and, preferably, about 75–95%, by weight. This may be accomplished by the use of such operations as filtration, decantation or centrifugation. However, best results appear to be obtained by the use of a continuous feed, solid bowl centrifuge of the type sold by the Bird Manufacturing Company of South Walpole, Mass. In any event, upon reducing the water content of its aqueous suspension, the extender resin particles will be in the form of damp mass, or wet cake as it is usually referred to. This wet cake of suspension resin particles is then transferred to a suitable vessel or blending tank where it is combined with the aqueous latex of the dispersion resin.

Alternatively, where the suspension resin is to be in the form of a dry powder when it will be combined with the dispersion resin latex, such powders may be prepared by means of two different procedures. Thus, the aqueous suspension of the suspension resin may be directly converted into a powder by means of a one-step drying operation using any desired type of drying apparatus such, for example, as a spray dryer. However, such one-step drying processes are far more expensive and are, therefore, less desirable than the use of a two-step drying process. The first step in such a two-step drying technique involves: putting the suspension of the extender resin into the form of a wet cake using any of the above described dewatering means, particularly a continuous feed, solid bowl centrifuge. The wet cake which, as noted above, may contain from about 5 to 50% of moisture, is then converted to an essentially moisture free, dry powder using any suitable drying means with the use of a rotary dryer being preferred.

Therefore, in considering this aspect of the process of this invention relating to the treatment of the suspension resin mixture prior to its being blended with the dispersion resin latex, it may be simply looked upon as an operation intended to reduce the water content of the suspension down to close to zero percent or, alternatively to within the range of from about 5 to 50%, by weight. The ability to select either of these two means of preparing the extender resin provides the practitioner with a highly desirable degree of flexibility in carrying out the novel blending process of this invention.

With respect to proportions, the resulting wet blend should have a total resin solids content, i.e., suspension resin plus emulsion resin solids, of from about 30 to 75, preferably about 60%, by weight. Within the total resin solids content of the blend, the extender resin should be present in a range of from about 1 to 70, preferably about 40%, by weight, while the dispersion resin should be present in a range of from about 30 to 99, preferably about 60%, by weight. Needless to say, the precise proportions of any particular blend, both with respect to its total resin solids content and the amounts of the extender and dispersion resins solids which are present therein, will be largely determined by the end use application in which it is to be employed.

Subsequent to the blending operation, the resulting product will ordinarily be completely dried prior to being formulated with plasticizers and other conventional compounding ingredients. Any suitable drying apparatus whose use is desired by the practitioner may be utilized for this operation. However, for most purposes, the use of a spray dryer is preferred. Spray dryers are well known in the art and are characterized by their employment of an atomizing device which disperses the liquid feed stock into a spray of droplets ranging in diameter from about 10 to 600 microns depending upon the type of atomizer used as well as the capacity and atomizing conditions. Hot gases, which may be introduced by means of a variety of gas-inlet configurations, contact the spray and evaporate moisture from the individual drops. The mixture of hot gases and dry particles is then separated so as to obtain the desired product in a finely divided form.

Subsequent to the spray drying operation, the mixture of emulsion and suspension resins will be in the form of dry particles in which the proportions of the emulsion and suspension resin solids will, of course, be the same as in the wet blend from which it was prepared. It is preferred, for most end use applications, that these particles should have a particle size in the range of from about 0.1 to 80 microns with optimum results being obtained with a particle size of about 50 microns. To achieve the latter particle size range, it may sometimes be necessary to subject the dry blend to the action of a device which can affect a reduction in particle size without the generation of heat which would ordinarily accompany the use of a milling or grinding apparatus. Thus, for this purpose it is desirable to employ devices which use mechanical energy or air pressure to hurl and to thereby impact the particles against a stationary surface. Such devices include the so-called Micro Atomizer manufactured by the Mikropul Division of Slick Corp., Summit, New Jersey.

Relative to the use of emulsion resin agglomerates as nucleating resins these agglomerates are dried or partially dried and added to an emulsion resin latex. This mixture is then spray dried to form the product resin. This sequence can be repeated as often as desired within the limitations imposed by the equipment being employed.

It should also be noted that the agglomerated emulsion resin as nucleating resin can be added to the latex in any amount provided that the resultant mixture remains sufficiently fluid to permit spray drying. This amount will generally be from about 1.0% to about 100% nucleating resin to latex based on resin solids and preferably from about 10% to about 50% based on resin solids.

The spray dried product includes a number of large agglomerates as well as some fines. If a uniform product is desired the product can be screened. This is generally not necessary however as the resins can be handled in bulk and yet readily fragment when used with plasticizer. It is of course an advantage not to have many fines present. For this reason it may be found desirable to remove such fine particles by screening or other convenient means. These fines can then be re-introduced to the latex and resprayed in the drying equipment or be otherwise employed.

As has been set forth above, it is necessary that the resin blend of latex and suspension resin be maintained and dried under non-coagulating conditions. This is a critical limitation within the scope of this invention.

If the resin is coagulated or permitted to coagulate under the conditions under which it is handled or dried, the resultant resin is invariably non-uniform in particle size and usually requires grinding or milling prior to use, especially if these resins are to be used in plastisol or organosol applications.

While commercial latex or dispersion resins in latex form generally contain a sufficient amount of surfactant to stabilize the resin latex against congulation under most conditions of handling and treatment, it may optionally be desired to post-stabilize the latex. This can be conveniently accomplished through the addition of a non-ionic surfactant. This surfactant is simply added to the latex and stirred.

Such non-ionic surfactant can be added in an amount of from 0.1 parts by weight to 5 parts by weight or greater based on the weight of resin solids. While it is seldom desired to add an amount of non-ionic surfactant to the system in excess of 5 parts by weight based upon latex as it is uneconomic to do so, this can be done if desired.

Preferably, if post-stabilization is to be employed, a non-ionic surfactant is added to the latex in an amount of from 0.5 to about 2 parts by weight to insure the resin blend will be dried under non-coagulating conditions.

The non-ionic surfactants are well known in the art and little space need be devoted to their description here. As a class however these surfactants include the polyoxyethylene surfactants, the ethoxylated alkyl phenols, the ethoxylated aliphatic alcohols, carboxylic acids which are polyol solubilized or polyoxyethylene solubilized or both, such as the glycerol esters, the polyethylene glycol esters, the polyoxyethylene derivatives of the rosin acids, the hydrosorbitol esters, ethoxyanhydrosorbitol esters, the glycol esters of fatty acids and ethoxylated natural fats, oils and waxes; carboxylic amides including diethanolamine condensates and mono-alkanol amine condensates and the like; polyoxyethylene fatty acid amides; polyalkylene oxide block copolymers and certain of the organosilicones.

As indicated above, these surfactants are well known and a substantial listing of such surfactants appears in the Encyclopedia of Chemical Technology, by Kirk Othmer, published by John Wiley & Son, 1969, Volume 19, pages 531 et seq.

As has also been indicated above, it is preferred to dry resins of this invention by conventional spray drying. The particular conditions of spray drying depend to a large extent on the properties of the resin being dried, the rate of material being dried, and the particular spray drying equipment employed. It is necessary that spray drying be conducted under noncoagulating conditions, that is to say shear must be such not to coagulate the blend of nucleating resin and latex.

Depending upon the variables or rate, resin properties and equipment employed, the air outlet temperature of the spray dryer should be such to effectively dry the resin and yet sufficiently low that the resin particles do not because sintered or fused. If this occurs, the resin product must be ground prior to use in plastisel, organosol applications.

Effective outlet temperatures have been found to be in the range of from about room temperature to 135° F. depending upon the variables set forth above. These temperatures will however generally be found to fall within the range of from about 90° F. to about 130° F. and preferably from 105° F. to 125° F.

Depending upon the particular equipment being employed air input temperatures will generally run in the range of about 250° F.

It should be kept in mind that if the air outlet temperature is too low, the drying is inefficient and if too high a resin product is produced which must be subsequently ground or milled.

Quite surprisingly, the dry nucleated blends resulting from the process of this invention have been found to display rather unique morphological characteristics which are believed to be directly responsible for their highly desirable properties.

These unique morphological characteristics are illustrated in the appended drawing in which FIG. 1 is a photomicrograph of an 8,000 power magnification, electron microscope image of an epoxy resin imbedded section of a specimen of one of the blends of this invention. In this photomicrograph, the numerous small particles are the dispersion resin particles while the large particle in the right center of the photomicrograph, which is surrounded by the emulsion or dispersion resin particles, is a suspension or extender resin particle.

Figure 2:
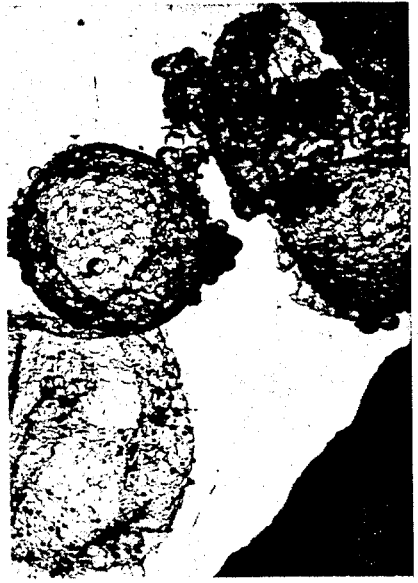

FIG. 2 is a photomicrograph of an 8,000 power magnification, electron microscope image of a carbon replica of a specimen of one of the blends of this invention. In this photomicrograph, the structure in the left center portion is the carbon replica of a suspension or extender resin particle surrounded over virtually its entire surface by a plurality of dispersion resin particles.

Figure 3:

FIG. 3 is a photomicrograph of an 8,000 power magnification, electron microscope image of an epoxy resin inbedded section of a specimen of a mixture prepared by blending samples of suspension resin and emulsion resin particles which were both completely dry at the time they were blended. The dispersion and extender resin used in preparing the blends depeicted in FIG. 3 and 4 were identical to those used in preparing the blends of this invention shown in FIGS. 1 and 2.

Figure 4:

FIG. 4 is a photomicrograph of an 8,000 power magnification, electron microscope image of a carbon replica of a sample of the indentical blend described in FIG. 3 which had been prepared by means of the prior art mixing process.

The epoxy resin imbedded sections shown in FIG. 1 and 3 were prepared by sandwiching the respective resin mixtures between the surfaces of two slabs of an epoxy resin gel, allowing the gel to harden and then cutting a microtome section transversely through the solidified gel. The resulting section is then viewed through the electron microscope and photographed.

The carbon replicas shown in FIGS. 2 and 4 were prepared by depositing finely divided carbon powder on the surfaces of the respective resin mixtures and then dissolving the resin particles with an organic solvent so as to leave a carbon shell or replica of the leached out resin particles. These replicas were then observed in the electron microscope and photographed.

As is clearly depicted in FIGS. 1 and 2, the dry blends of dispersion and extender resins resulting from the unique mixing process of this invention are novel compositions of matter which comprise mixtures of a plurality of dispersion resin and extender resin particles wherein substantially all of the dispersion and extender resin particles which comprise these mixtures are in the form of a plurality of characteristic structures.

In these characteristic structures such, for example, as in the structure shown in FIG. 1, it is seen that a plurality of dispersion resin particles are in contact with and virtually surround the entire surface of only one centrally positioned extender resin particle. However, in some instances, those blends may contain mixtures of these characteristic structures in which a majority of the structures will contain one centrally positioned extender resin particle having a plurality of dispersion resin particles in contact with its surface while the balance of those structures will contain a cluster or agglomerate of from two up to a maximum of about five of these centrally positioned extender resin particles. The presence or absence of these agglomerates of extender resin particles in these characteristic structures which are found in the blends of this invention as well as the precise number of extender resin particles in these centrally positioned agglomerates is believed to be largely dependent upon the conditions under which the wet blend resulting from the mixing process is dried. However, it is to be emphasized that, in most instances, these structures will contain only one centrally positioned extender resin particle.

These unique structures which are found in the blends of this invention are believed to be created by capillary action, i.e. by surface tension forces. In any event, it is quite clear that these structures which comprise the blends of this invention are completely different in their morphological characteristics from the structures found in the blends of extender and dispersion resins which result from the prior art mixing process. Thus, as is seen in FIGS. 3 and 4, in these prior art mixtures, the dispersion resin particles exist in the form of agglomerates which make little or no contact with the surface of the extender resin particles.

As a result of the presence of these unique structures in the blends of this invention, their properties are markedly superior to the prior art blends made by combining extender and dispersion resins after they have both been completely dried. Thus, as will be shown in the following examples, these novel blends yield plastisols characterized by their improved nonsettling properties, their improved dispersion, wetting and mixing characteristics, their improved rheological properties, i.e. their unexpectedly high pseudoplastic properties, their improved air release and their improved aging properties. Moreover, the bulk handling properties of these blends are found to substantially improve.

In preparing plastisols drom the dried blends resulting from the process of this invention, they need merely be mixed with from about 5 to 200%, as based on the weight of the resin blend solids, of one or more liquid plasticizers by means of procedures well known to those skilled in the art. These procedures ordinarily involve adding the plasticizer to the dry resin blend and properly mixing. Suitable liquid plasticizers include, but are not limited to:

Dimethyl phthalata
Diethyl phthalate
Dimethoxy ethyl phthalate
Dibutyl phthalate
Butyl cyclohexyl phthalate
Butyl benzyl phthalate
Dibutoxy ethyl phthalate
Di-2-ethylbutyl phthalate
Bis(diethylene glycol monoethyl ether)phthalate
Di-n-hexyl phthalate
Di-2-ethylhexyl phthalate
Diiso-octyl phthalate Di-2-ethylhexyl hexahydrophthalate
Tri-n-butyl phosphate
Tribuxoxyethyl phosphate
Cresyl diphenyl phosphate
2-ethylhexyl diphenyl phosphate
Tricrosyl phosphate
Di-n-hexyl adipate
Di-butyl-2-ethoxyethyl adipate
Di-2-ethylhexyl adipate
Diiso-octyl adipate
Octyl decyl adipate
Butyl phthalyl butyl glycollate
Ethyl phthalyl ethyl glycollate
Di-n-butyl sebacate
Di-2-ethylhexyl sebacate
Di-2-ethylhexyl azelate
Methoxyethyl acetyl ricinoleate
Polygolycol di-2-ethylhexanoate
Polyesters of dibasic acids and diols (sold as different grades of "Paraplex" by the Rohn & Haas Co.)
Chlorinated paraffin
Epoxidized soya oil
Tetra-n-butyl thio disuccinate
Bis(dimethyl benzyl)ether
Dipropylene glycol dibenzoate These plastisols may also, if desired, contain various optional additives which can include lubricants and mold release agents such as stearic acid or its metal suits, petroleum based waxes, mineral oils, polyethylene waxes, etc.; viscosity depressing non-ionic surfactants such as polyethylene glycol monolaurate; heat and light stabilizers including heat stabilizers such as barium, cadmium, calcium and zinc soaps or phenates, basic lead compounds, organo-tin compounds such as dialkyl tin mercaptides and dialkyl tin maleates, thiolauric anhydride and n-butyl stannoic acid, epoxidized oils, alkyl diphenyl phosphites and triaryl phosphites and light stablizers such as the phenyl salicylates, benzophenones and benzotriazoles, and, pigments, dyes and opacifying agents. Volatile diluents or dispersants which can be used in preparing organosols include methanol, propanol, butanol, pentanol, octanol, isoparaffins and various commercially available mixtures such as "APCO" thinner, "VM & P" naphtha, "Stoddard" solvent, "VARSOL #2","SOLVESSO#100" and "SOLVESSO #150". For a more complete listing of plasticizers, lubricants, stabilizers and other functional additives, one may consult "Polyvinyl Chloride" by H. A. Sarvetnick published by Van Nostrand Reinhold Co., New York, N. Y., in 1969.

The plastisols and organosols containing the mixtures of dispersion and extender resins resulting from the blending process of this invention may be used in all of the above described molding, film casting and film coating applications in which plastisols and organosols are ordinarily employed. In addition, it may be noted that they display particular utility in a number of specialized applications which include the preparation of chemically blown, formed resins for such uses as vinyl flooring, upholstery and the like, using chemical blowing agents such as the aliphatic and halogenated hydrocarbons, low boiling alcohols, ethers, ketones and aromatic hydrocarbons, ammonium or sodium bicarbonate and most preferably, azo compounds such as azodicarbonamide using azodicarbonamide blowing agents, for the vinyl flooring industry; the preparation of mechanically frothed foamed resins for the carpet industry; as spread coating resins, i.e. as resins used in coating fabrics sheet metal and the like; as rotational casting resins; and as cap liner resins, i.e. resins used to line the caps of soft drink and beer bottles.

Traditionally, plastisol grade vinyl resins have been shipped in bags of 40 to 50 pounds. Unlike the suspension or extender grade resin, the plastisol grade resins could not be effectively handled in bulk, unless the resins were prepared in a manner which required grinding of the resin after shipment. Since such grinding requires heavy investment in equipment and is a time consuming operation, bulk handling of plastisol grade resins has not become a reality.

Additionally, bulk handling requires investment in bulk handling equipment. While this cost is offset by reduced labor handling costs, elimination of bag costs, and speed of loading and unloading operations, its advantages are lost if the resins must be ground prior to use.

The bags in which the plastisol resins are shipped are generally of Kraft paper and large numbers of bags accumulate. The disposal of the bags also adds to the eventual cost of this type of handling.

For these reasons, bulk handling is the desired way to ship and handle such resins and has been long sought by the industry.

Unfortunately, the plastisol grade resins, until the present invention, were simply not amenable to bulk handling. The resin particles are of a size and shape which makes them become readily impacted which impedes the bulk loading operation. Procedures which have been proposed to provide a bulk handling system have for the most part been limited to types of equipment such as vibrators and automatic banners to keep the resin from impacting. Until the present invention, no plastisol grade resin, ready for use, has been proposed which could be readily handled by conventional bulk loading equipment.

The resins made in accordance with this invention are of a particle size and configuration which permits bulk handling in conventional equipment. These resins maintain their general size and configurations with minimal attrition when subjected to the rigors of bulk handling and bulk shipment. Yet, when these resins are formulated and blended in conventional processes they readily fragment to the required particle size without the requirment of grinding or milling steps. The resins of this invention have filled a long felt need in the industry which has not been adequately met until this invention.

The following examples will further illustrate the embodiment of this invention. In these examples, all parts and percentages are by weight unless otherwise noted.

EXAMPLE I

The example illustrates the preparation of a blend of a dispersion and extender resin by means of the novel process of this invention as well as the use of the resulting blend in the preparation of a plastisol. It also demonstrates the superior properties displayed by the plastisol containing this blend when compared with a plastisol derived from a blend of the identical dispersion and extender resin which, in this case, is prepared by means of the prior art blending process.

Part A

The emulsion or dispersion resin used in preparing this blend is an aqueous latex of polyvinyl chloride having a total resin solids content of about 40%, by weight, in which the resin particles have an average diameter of about 1.0 microns and a relative viscosity of about 2.45 as determined, at 25° C. with a 1.0%, by weight, solution of the polymer in cyclohexanone.

The suspension or extender resin utilized in this blending procedure is an aqueous suspension of polyvinyl chloride having a total resin solids content of about 35%, by weight, in which the resin particles have an average diameter of about 30 microns and a relative viscosity of about 2.05 as determined, at 25° C., with a 1.0%, by weight, solution of the polymer in cyclohexanone. Prior to the blending operation, the aqueous suspension of the extended resin is first converted to the form of a dry powder by being subjected to the action of a Bird centrifuge which produces a wet cake containing about 19% of water which is then dried in a rotary dryer.

In carrying out the blending operation, 150 parts of the dispersion resin latex are mixed with 40 parts of the dried extender resin whereupon the resulting mixture, which has a total resin solids content of 52.5%, by weight, of which 60% is dispersion resin solids and 40% is extender resin solids is spray dried in a conventional spray drying apparatus at a temperature such that the air outlet temperature of the spray dryer was maintained at about 120° F. The dried mixture thus contains 60% of dispersion resin solids and 40% of extender resin solids. A plastisol is then prepared by admixing 100 parts of the spray dried blend with 60 parts of dioctyl phthalate in a Hobart mixer, i.e. a variable speed mechanical agitator.

Part B

The dispersion resin latex and the extender resin suspension described in Part A are used to prepare a plastisol by means of a typical prior art blending process. This procedure involves spray drying the dispersion resin latex in a conventional spray dryer at a temperature such that the air outlet temperature was maintained at a temperature of about 155° F. This results in the formation of a substantial number of agglomerates which range up to 100 microns in their particle size. The spray dried powder is then subjected to the action of a micro atomizer which reduces the size of the agglomerates to no more than about 40 microns. The extender resin is prepared by first reducing its water content to about 12%, by weight, by subjecting it to the action of a Bird centrifuge. The resulting resin wet cake is then completely dried in a rotary dryer.

A plastisol is then prepared by admixing a total of 60 parts of the dried disparison resin together with 60 parts of dioctyl phthalate and 40 parts of the dried extender resin.

Part C (1) The plastisols whose respective preparation is described in Parts A and B, hereinabove, are compared by subjecting them to a number of evaluation procedures as described below.

The low shear rheological properties of the respective plastisols are evaluated by subjecting them to the action of a Brookfield Model RVP Viscometer, using a No. 6 spindle. Thus, a good product will display decreasing viscosity values as the shear rate increases. The following table provides the results of this comparison:

| | Brookfield Viscosity (Poises) | | | | | |
|---|---|---|---|---|---|---|
| | Plastisol of Part A | | | Plastisol of Part B | | |
| RIM | 2 hrs. | 24 Hrs. | 7 Days | 2 Hrs. | 24 Hrs. | 7 Days |
| 2 | 70 | 75 | 65 | 40 | 45 | 50 |
| 4 | 50 | 57.5 | 55 | 37.5 | 42.5 | 50 |
| 10 | 43 | 44 | 43 | 34 | 40 | 48 |
| 20 | 36.5 | 37.5 | 38 | 32.5 | 38.5 | 47.5 |

(2) The high shear rheological properties of the respective plastisols are evaluated by determining their Sevors Viscosity Values by means of a procedure which measures the flow of the plastisol sample through a standard 5 cm. long by 0.3 cm. orifice while it is being subjected to varying pressures. Thus, a good plastisol will display decreasing viscosity values as the shear rate increases. The following table provides the results of this comparison.

| | Severe Viscosity (Poises) | | | |
|---|---|---|---|---|
| Pressure | Plastisol of Part A | | Plastisol of Part B | |
| (psig) | 2 Hrs. | 24 Hrs. | 2 Hrs. | 24 Hrs |
| 20 | 32 | 34 | 39 | 47 |
| 60 | 28 | 29 | 36 | 40 |
| 100 | 24 | 25 | 30 | 37 |

The above data clearly demonstrate the improved low and high shear viscosity characteristics displayed by the plastisol of Part A containing the novel resin blend of this invention. (3) The air release proportions of the respective plastisols are evaluated by means of the two different techniques described below. Air release relates to the rate at which an air bubble is passed out from a plastisol or organosol. Thus, fast air release is highly desirable since the entrapment of air bubbles in the films, coatings and other products prepared from plastisols and organosols would detract from the quality and appearance of such products.

(a) in this procedure, a sealed vessel containing a given volume of plastisol is evacuated and the percentage increase in the volume of the plastisol sample is noted. Thus, a minimum increase in volume under these conditions is indicative of a good plastisol. The following table provides the results of this comparison.

| | % Increase in Volume of Sample |
|---|---|
| Plastisol of Part A | 200 |
| Plastisol of Part B | 300 |

(b) in this procedure, known as the Huff ring method, there is employed a pipe having a length of 1 inch an inner diameter of 2 inches and which has holes bored around its circumference which vary in their diameter from 3/8 inch to 1/32 inch. This pipe is dipped into a sample of the plastisol, allowed to fill, removed from the sample and the time required for the film which forms across the ¼ inch hole to break is then noted. It is desirable for plastisols to display a rapid time for this test. The following table provides the results of this comparison:

| | Time for Film to Break |
|---|---|
| Plastisol of Part A | 5.8 Seconds |
| Plastisol of Part B | 12.4 Seconds |

The data obtained by each of the two above described procedures indicates improved air release properties displayed by plastisols prepared with the novel resin blends of this invention.

(4) The settling characteristics of the plastisols are evaluated by allowing samples to stand in glass jars and visually observing the bottoms of the respective containers for the presence of resin particles and agglomerates. These observations are made after periods of 1, 7 and 28 days. A plastisol displaying little or no settling is, of course, more desirable than a plastisol which undergoes a substantial amount of settling. The following table provides the results of this comparison:

| | Degree of Settling Observed | | |
|---|---|---|---|
| | After 1 Day | After 7 Days | After 28 Days |
| Plastisol of Part A | 0 | 0 | 0 |
| Plastisol of Part B | Slight | Slight | Some |

The above given data demonstrates the superior settling characteristics displayed by plastisols containing the novel resin blends of this invention.

EXAMPLE II

This example illustrates the preparation of another of the novel blends of this invention as well as its use in the preparation of a plastisol. It also demonstrates the superior properties displayed when the plastisol containing this blend is converted into a chemically blown foam formulation when compared with a chemically blown foamed plastisol derived from a blend of the identical

15 dispersion and extender resins which, in this case, is prepared by means of the prior art blending process.

Part A

The dispersion resin used in preparing this blend is an aqueous latex of polyvinyl chloride having a total resin solids content of about 41%, by weight, in which the resin particles have an average diameter of about 0.8 microns and a relative viscosity of about 2.10 as determined at 25° C. with a 1.0%, by weight, solution of the polymer in cyclohexanone.

The extender resin utilized in this blending procedure is an aqueous suspension of polyvinyl chloride having a total resin solids content of 30%, by weight, in which the resin particles have an average diameter of 30 microns and a relative viscosity of 2.19 as determined, at 25° C., with a 1.0%, by weight, solution of the poymer in cyclohexanone. Prior to the blending operation, the aqueous suspension of the extender resin is converted into the form of a wet cake by reducing its water content to 19%, by weight, by filtering the resin slurry in a laboratory filter device.

In carrying out the blending operation, 62 parts of the dispersion resin latex are admixed with 38 parts of the extender resin wet cake whereupon the resulting mixture, which has a total resin solids content of 50.4%, by weight, of which 60% is disperson resin solids and 40% is extender resin solids is spray dried at a temperature such that the air outlet temperature of the spary dryer was maintained at a temperature of about 120° F. The spary dried mixture thus contains 60% of dispersion resin solids and 40% of extender resin solids. A foamable plastisol is then prepared by admixing 100 parts of the spray dried blend with 40 parts of dipropylene glycol dibenzoate, 2 parts of titanium dioxide, 2 parts of azodicarbonamide, 15 parts of an epoxy plasticizer sold as "Paraplex G-62" by the Rohm & Haas Co. and 2 parts of a zinc octoate stabilizer. Upon removing a sample of this formulation and letting it stand, no settling of any particulate materials are noted after a period of 24 hours.

The resulting formulation is then cast onto a silicone treated release paper so as to yield a wet film having a thickness of 20 mils. This film is then gelled by being heated, in an oven, at 250° F. for a period of 3 minutes. The thickness of the gelled film is then measured whereupon it is cut into 2 inch squares which are then blown into foams by being heated in an oven which is set at 370° F. for a period of 5 minutes. The thickness of the resulting foams is then measured and their cell structure is examined with respect to the size and uniformity of the individual cells. The blow ratio of this foamed plastisol i.e. the ratio of its foam thickness to its gel thickness, is then calculated. A plastisol formulation haaving a high blow ratio is highly desirable since it permits the practitioner to use less of the expensive blowing agent than would be required in a plastisol formulation having a low blow ratio as well as a fine uniform cell structure.

Part B

A commercial foam dispersion resin and extender resin were used to prepare a plastisol of the same composition as Part A. Both resins were produced by prior art procedures. Upon standing the resultant plastisol exhibited substantial setting after 24 hours.

Part C

Upon comparing the quality of the foams whose preparation is described in Parts A and B of this example, it is found that they were comparable. This is quite surprising since it would have been expected that the use of an unground dispersion resin in the blending process of this invention, i.e. the process of Part A, would have led to poor results as evidenced by a poor foam structure and coarse cells.

EXAMPLE III

This example illustrates the preparation of additional blends of dispersion and extender resin typical of the products of this invention.

Samples of the dispersion resin latex and of the extender resin suspension described in Part A of EXAMPLE II are combined by means of the process set forth in Part A of EXAMPLE II so as to produce a number of different blends in which the respective proportions of dispersion resin and extender solids are as follows:

| % Emulsion Resin Solids | % Suspension Resin Solids |
|---|---|
| 60 | 40 |
| 55 | 45 |
| 50 | 50 |

Foamed plastisols are prepared from each of these blends by means of the procedure described in Part A of EXAMPLE II and, in each case, the resulting foams are found to display excellent properties comparable to those described in Part C of EXAMPLE II for the foams made with the blend described in Part A of EXAMPLE II.

EXAMPLE IV

This example illustrates the preparation of additional blends of dispersion and extender resins typical of the products of this invention.

The dispersion resin used in this example is identical to the dispersion resin described in Part A of EXAMPLE I. The extender resin used is an aqueous suspension of polyvinyl chloride having a total resin solids content of about 30%, by weight, in which the resin particles have an average diameter of about 35 microns and a relative viscosity of about 2.19 prior to the blending operation. The aqueous suspension of the extender resin is converted into the form of a wet cake by reducing its water content to about 15%, by weight, by subjecting it to the action of a Bird centrifuge. The resin was then dried in a rotary dryer.

In carrying out the blending operation, 81 parts of the emulsion resin latex are admixed with 19 parts of the suspension resin wet cake whereupon the resulting mixture, which has a total resin solids content of 51.5%, by weight, of which 60% is emulsion resin solids and 40% is suspension resin solids, is spray dried. The spray dried mixture thus contains 60% of dispersion resin solids and 40% of extender resin solids. A plastisol is then prepared by admixing 100 parts of the spray dried blend with 60 parts of dioctyl phthalate.

Following this same blending procedure, there are prepared a number of different spray dried blends of the above described dispersion and extender resins having the following composition:

| % By Wt. Dispersion Resin | % By Wt. Extender Resin |
|---|---|
| 70 | 30 |
| 60 | 40 |
| 50 | 50 |
| 30 | 70 |

Each of these resin blends is used to prepare plastisols in which 100 parts of the blend are admixed with 60 parts of dioctyl phthalate. These plastisols all display excellent properties far superior to plastisols made with blends of the identical dispersion and extender resins which are admixed by means of the prior art blending procedure described in Part B of EXAMPLE 1. Thus, for example, it is noted that no settling of resin solids or agglomerates is observed after 24 hours with the plastisol containing the 30:70 dispersion resin:extender resin blend made by means of the process of this invention. By contrast, with the plastisol containing the 30:70 blend prepared by means of the prior art blending procedure extensive settling of resin solids and agglomerates is observed after only 2 hours.

EXAMPLE V

Comparison of bulk handling properties and product quality of the spray dried product of this invention in comparison with coagulated and a dry blend of the resins:

Sample A

A commercial latex resin (dispersion grade) was prepared as a latex. A commercial suspension resin (extender grade) was similarly prepared. The suspension resin was added to the latex in an amount to form a mixture of 60 parts by weight latex resin and 40 parts by weight suspension resin (solids). In order to coagulate the mixture, 2% by weight calcium chloride was added. The coagulated resin was tray dried at a temperature of about 212° F.

Sample B

A dry blend of the latex resin in Sample A and the suspension resin in Sample A was prepared in the same weight ratio by simple mixing in a Hobart mixer.

Sample C

A resin within the scope of this invention was prepared by adding the suspension resin in Sample A to the latex in Sample A to form a liquid mixture containing 60 parts latex resin to 40 parts suspension resin (solids). This mixture was maintained in an uncoagulated state and was spray dried, with air outlet temperature of about 120° F.

Sample D

This sample was prepared in a manner identical to that for Sample A except that the sample was tray dried at a temperature of 120° F.

The four samples were analyzed for particle size by screening. The results obtained were as follows for 100 gram samples:

| Mesh Size (U.S.) | Sample | | | |
|---|---|---|---|---|
| | A | B | C | D |
| 32 | 52.0 | 22.4 | 0 | 90 |
| 40 | 5.0 | 4.8 | 0 | 1.4 |
| 60 | 15.4 | 11.8 | 0 | 3.6 |
| 80 | 16.3 | 5.5 | 0 | 1.9 |

-continued

| Mesh Size (U.S.) | Sample | | | |
|---|---|---|---|---|
| | A | B | C | D |
| Pan | 11.3 | 55.5 | 100 | 3.1 |

From these results it can be seen that Sample C exhibits a high degree of resin uniformity and no tendency to "pack" in comparison with samples A, B and D.

The samples were evaluated for fineness of grind by preparing paste samples of each resin blend with 60 parts of dioctyl phthalate plasticizer and drawing each of the samples on a standard fineness of grind plate.

The results were as follows:

| | A | B | C | D |
|---|---|---|---|---|
| Fineness of Grind (P.O.G.) | 250/250 | 110/70 | 130/125 | 200/150 |

Sample A was screened through a 60 mesh screen and a paste was similarly made from the screened resin. The fineness of grind test was repeated. The fineness of grind of the screened sample was also 250/250.

Flowability

A 17 mm plastic funnel was finger held at the bottom and the flow determined when the finger was removed. Light tapping on the funnel was employed. The flow of Sample A, Sample C and D was excellent. The flow of Sample B was very poor as the sample impacted almost immediately.

Conclusions

1. Sample A exhibited unacceptable properties in respect to product quality. Generally, extended plastisols must mix into a uniform paste without large agglomerates as were noted in the coagulated sample. Sample D was better than A but still gritty. Those coagulated resins would appear to require postgrinding before use in plastisol applications.

2. Bulk flow of the coagulated resin of Samples A and D were essentially as good as that of Sample C. Dry blended Sample B exhibited nowhere near the properties of A and C being slightly better than dispersion grade resin alone.

3. Dispersion and extender resins that are acceptable for plastisol and organosol applications generally have fineness of grind values (FOG) of less than 150u and 100% passing an 80 mesh screen. The screen analysis of the dry blended Sample B exhibited the bulk flow properties noted above since all of this material should easily pass an 80 mesh screen. The dispersion resin in Sample B is lumping which is typical of commercial dispersion resins.

EXAMPLE VI

Preparation of Agglomerated Emulsion Nucleating Resins

Approximately 15 pounds of polyvinyl chloride emulsion resin latex having a total resin solids content of about 40% by weight in which the resin particles have an average diameter of about 1.0 microns and a relative viscosity of about 2.45 as determined at 25° C. with a 1.0% by weight solution of the polymer in cyclohexanone was used in this experiment. This latex was spray dried in a pilot plant spray dryer under conditions such that the air outlet temperature was maintained at a temperature of about 120° F. Approximately 5 pounds of dried agglomerated resin was recovered. This resin had a particle size of about 5 to about 20 microns in size. When added to a conventional plasticizer the resin completely dispersed.

This material can be employed as a nucleating resin within the teachings of this invention by adding the material to an emulsion latex and spray drying the blend at temperatures which provide air outlet temperatures less than 130° F. to provide resin agglomerates of increased particle sizes. This procedure can be repeated as often as desired or a mixture of agglomerate sizes can be used.

EXAMPLE VII

Bulk Handling Properties

The suspension emulsion polyvinylchloride blend of Example II-A was made in large quantity. Approximately 30,000 pounds of this resin was bulk loaded into a conventional bulk containing truck. This truck was sent to Buffalo, New York from Delaware City, Delaware, about 300 miles. The truck returned to Delaware City where it was unloaded in bulk by pneumatic conveyor into a check bin. The unloading was conducted without difficulty.

Variations may be made in proportions, procedures and materials without departing from the scope of this invention as defined in the following claims.

What is claimed is:

1. A bulk handleable, dry, non-coagulated blend of vinyl chloride emulsion resin and vinyl chloride suspension resin adapted for use in preparing plastisols and organosols, said blend comprising:
   (a) from about 30% to about 99%, by weight, of particles of vinyl chloride emulsion resin having an average diameter in the range of from about 0.1 to about 3.0 microns and a relative viscosity as determined as a 1%, by weight, solution in cyclohexanone at 25° C., of from about 1.5 to about 3.5; and
   (b) from about 1% to about 70%, by weight, of particles of vinyl chloride suspension resin having an average particle diameter in the range of from about 5 to about 60 microns and a relative viscosity as determined as a 1%, by weight, solution in cyclohexanone at 25° C., of from about 1.5 to about 3.5, substantially all of the emulsion and suspension resin particles in the blend being in the form of a plurality of structures wherein a plurality of emulsion resin particles are in contact with at least one centrally positioned suspension resin particle.

2. The blend of claim 1 wherein a major portion of the structures which comprise the blend contain only one centrally positioned suspension resin particle, with the balance of the structures in the blend containing more than one centrally positioned suspension resin particle.

3. The blend of claim 1, wherein the structures which comprise the blend contain only one centrally positioned suspension resin particle.

4. The blend of claim 1, wherein the average diameter of the emulsion resin particles is about one micron.

5. The blend of claim 1, wherein the average diameter of the suspension resin particles is about 30 microns.

6. The blend of claim 1, wherein the relative viscosity of the emulsion resin particles is about 2.5.

7. The blend of claim 1, wherein the relative viscosity of the suspension resin particles is about 2.5.

8. The blend of claim 1, wherein the emulsion resin particles are particles of polyvinyl chloride.

9. The blend of claim 1, wherein the suspension resin particles are particles of polyvinyl chloride.

10. A bulk handleable, dry, non-coagulatated vinyl chloride emulsion resin blend adapted for use in preparing plastisols and organosols, said blend comprising:
    (a) from about 30% to about 99%, by weight, of particles of vinyl chloride emulsion resin having an average diameter in the range of from about 0.1 to about 3.0 microns and a relative viscosity as determined as a 1%, by weight, solution in cyclohexanone at 25° C., of from about 1.5 to about 3.5; and
    (b) from about 1% to about 70% by weight of particles of agglomerated vinyl chloride emulsion resin which are adapted to readily fragment in plasticizer, the agglomerated resin having an average particle diameter of at least about 5 microns and formed from resin having a relative viscosity as determined as a 1%, by weight, solution in cyclohexanone at 25° C., of from about 1.5 to about 3.5, substantially all of the emulsion and agglomerated emulsion resin particles in the blend being in the form of a plurality of structures wherein a plurality of emulsion resin particles are in contact with at least one centrally positioned agglomerated emulsion resin particle.

11. The blend of claim 10, wherein a major portion of the structures which comprise the composition contain only one centrally positioned agglomerated emulsion resin particle with the balance of the structures in the composition containing more than one centrally positioned agglomerated emulsion resin particle.

12. The blend of claim 10, wherein the structures which comprise the blend contain only one centrally positioned agglomerated emulsion resin particle.

13. The blend of claim 10, wherein the average diameter of the emulsion resin particles is about one micron.

14. The blend of claim 10, wherein the average diameter of the agglomerated emulsion resin particles is about 30 microns.

15. The blend of claim 10, wherein the relative viscosity of the emulsion resin particles is about 2.5.

16. The blend of claim 10, wherein the emulsion resin particles and agglomerated emulsion resin particles are particles of polyvinyl chloride.

17. A bulk handleable, dry, non-coagulated blend of vinyl chloride nucleating resin and vinyl chloride emulsion resin adapted for use in preparing plastisols and organosols, said blend comprising:
    (a) from about 30% to about 99%, by weight, of particles of vinyl chloride emulsion resin; and
    (b) from about 1% to about 70%, by weight, of particles of vinyl chloride nucleating resin, the particles of (a) and (b) being in the form of a plurality of structures wherein the emulsion resin particles are in contact with one or more centrally positioned nucleating resin particle.

18. A blend as claimed in claim 17 wherein the nucleating resin comprises polyvinyl chloride suspension resin.

19. A blend as claimed in claim 18 wherein the emulsion resin is polyvinyl chloride.

20. A blend as claimed in claim 17 wherein the emulsion resin particles have an average diameter in the range of from about 0.1 to about 3.0 microns.

21. A blend as claimed in claim 17 wherein the nucleating resin particles are suspension resin and have an average diameter in the range of from about 5 to about 60 microns.

22. A blend as claimed in claim 17 wherein the nucleating resin particles are agglomerated emulsion resin particles and the agglomerates have an average diameter in the range of from about 5 to 60 microns.

23. A blend as claimed in claim 17 wherein the emulsion resin particles and the resin particles forming the nucleating resin have a relative viscosity as determined as a 1%, by weight, solution in cyclohexanone at 25° C. of from about 1.5 to about 3.5.

24. A blend as claimed in claim 17 wherein the emulsion resin particles are polyvinyl chloride homopolymer.

25. A blend as claimed in claim 17 wherein the nucleating resin particles are polyvinyl chloride homopolymer.

26. A blend as claimed in claim 17 comprising about 40%, by weight, nucleating resin and 60%, by weight, emulsion resin.

* * * * *

UNITED STATES PATENT AND TRADEMARK OFFICE
CERTIFICATE OF CORRECTION

PATENT NO. : 4,097,558
DATED : June 27, 1978
INVENTOR(S) : Leroy B. Kuhn

It is certified that error appears in the above-identified patent and that said Letters Patent are hereby corrected as shown below:

Col. 1, line 51, "of" should be -- or --;
Col. 3, line 44, "esters" should be -- ethers --;
Col. 8, line 21, "or" should be -- of --;
Col. 8, line 25, "because" should be -- become --;
Col. 8, line 26, "plastisel" should be -- plastisol --;
Col. 9, line 2, "depeicted" should be -- depicted --;
Col. 10, line 12, "drom" should be -- from --;
Col. 10, line 22, "phthalata" should be -- phthalate --;
Col. 10, line 51, "Polygolycol" should be -- Polyglycol --;
Col. 10, line 61, "suits" should be -- salts --;
Col. 11, line 25, "formed" should be -- foamed --;
Col. 11, line 67, "banners" should be -- hammers --;
Col. 13, line 20, "disparison" should be -- dispersion --;
Col. 13, line 31, "RVP" should be -- RVF --;
Col. 13, line 39, "RIM" in the Table should be -- RPM --;
Col. 13, line 55, "Severe" in the Table should be -- Severs --;
Col. 13, line 65, "proportions" should be -- properties --;
Col. 15, line 17, "poymer" should be -- polymer --;
Col. 15, lines 30 and 32, "spary" should be -- spray --;

UNITED STATES PATENT AND TRADEMARK OFFICE
CERTIFICATE OF CORRECTION

PATENT NO. : 4,097,558

DATED : June 27, 1978

INVENTOR(S) : Leroy B. Kuhn

It is certified that error appears in the above-identified patent and that said Letters Patent are hereby corrected as shown below:

Col. 18, line 18, "(P.O.G.)" in the Table should be -- (F.O.G.) -- and

Col. 18, line 39, "Those" should be -- These --.

Signed and Sealed this

Second Day of October 1979

[SEAL]

Attest:

RUTH C. MASON
Attesting Officer

LUTRELLE F. PARKER
Acting Commissioner of Patents and Trademarks